United States Patent

[11] 3,604,766

[72] Inventors William F. Bankauf
 East Paterson;
 Daniel J. Di Antonio, Nutley, both of, N.J.
[21] Appl. No. 884,944
[22] Filed Dec. 15, 1969
[45] Patented Sept. 14, 1971
[73] Assignee Hewitt-Robins Inc.

[54] SUPPORT ASSEMBLY FOR IDLER ROLLS
 7 Claims, 6 Drawing Figs.
[52] U.S. Cl. ................................................. 308/20,
 184/15, 184/105, 198/192, 248/14
[51] Int. Cl. ....................................................B65g 15/60,
 F16c 13/00, F16n 7/24
[50] Field of Search............................................ 308/20;
 198/192; 248/14; 287/111; 138/109; 184/61, 1,
 15, 105

[56] References Cited
 UNITED STATES PATENTS
2,539,792 1/1951 Niemitz......................... 198/192 X
3,332,536 7/1967 Ebly et al...................... 308/20 X Primary Examiner—Martin P. Schwadron
Assistant Examiner—Barry Grossman
Attorneys—John D. Boos and John D. Lister ABSTRACT: A support assembly for supporting both the outer ends and the adjacent ends of shafts for idler rolls has the capped ends of the shafts disposed in horizontally extending openings or slots provided in bracket members of the assembly. Grommets disposed in the brackets which receive the adjacent ends of idler roll shafts permit lubricant to be transferred between the capped ends of the shafts, and cover members detachably mounted on the bracket members retain the capped shaft ends in place and the grommets in their operable positions.

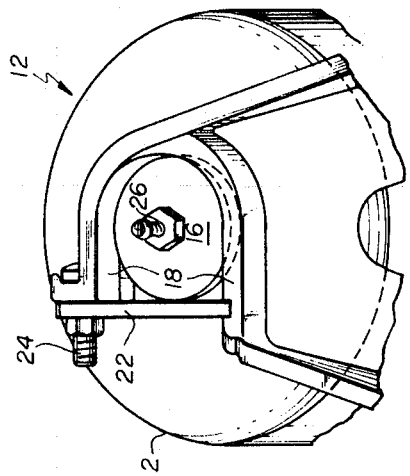
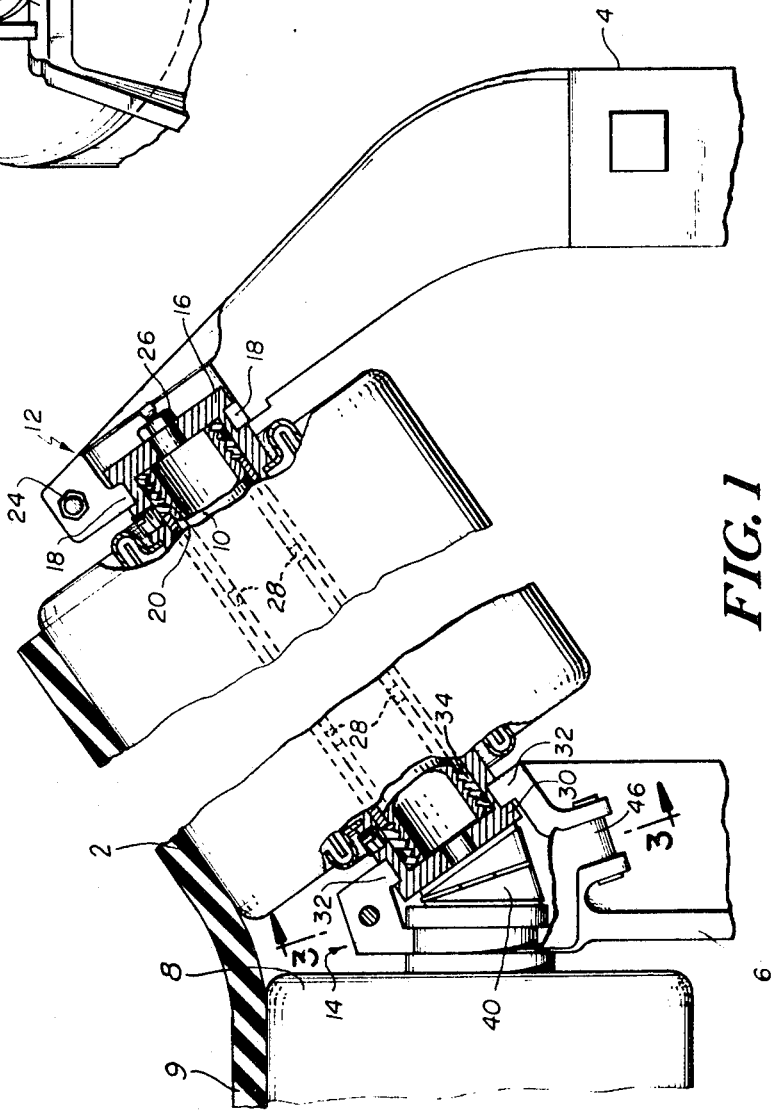
INVENTORS
WILLIAM F. BANKAUF
DANIEL J. DiANTONIO
BY
John D Lister
ATTORNEY.

INVENTORS
WILLIAM F. BANKAUF
DANIEL J. DiANTONIO

BY

John D Lister
ATTORNEY.

3,604,766

SUPPORT ASSEMBLY FOR IDLER ROLLS

BACKGROUND OF THE INVENTION

This invention relates to a support assembly for idler rolls, and, more particularly, to such an assembly in which the idler rolls are adapted to support and trough a run of an endless belt conveyor.

Various types of support systems for idler rolls have been proposed, and some feature the use of a grease through lubrication system in which grease is initially introduced into the shaft of one of a series of idler rolls, and flows through the shafts of the remaining rolls in order to grease all of the rolls through one conveniently located fitting.

However, due to the complexity of the support assemblies required for these rolls, it is difficult to disassemble and reassemble the rolls in the event servicing and/or replacement of the rolls or belt is required.

SUMMARY OF THE INVENTION

It is therefore an object of the present invention to provide a support assembly for idler rolls which provides grease through lubrication, while permitting easy insertion and removal of the respective rolls from the mounting bracket members of the assembly.

A further object of the present invention is to provide a support assembly with bracket members having covers and grommet retainers which urge the sealing grommets interposed between adjacent ends of idler roll shafts into sealing contact with the end caps of the shafts as the cover is being closed and secured in position.

It is a further object of the present invention to provide such support assemblies with grommets wherein the pressurized lubricant within the grommets increases the sealing pressure between the sealing surfaces of the grommets and the end caps of the idler roll shafts to improve the sealing characteristics of the assembly.

Toward the fulfillment of these objects the support assembly of the present invention comprises a first set of bracket members defining horizontally extending openings or slots for receiving the adjacent ends of shafts for idler rolls and a second set of bracket members defining horizontally extending openings or slots for receiving the outer ends of idler roll shafts. The horizontally extending openings or slots in the bracket members permit the rolls to be inserted into or removed from the brackets by moving the rolls parallel to the belt whereby the belt does not interfere with roll replacement and the replacement of rolls is greatly facilitated. Grommet assemblies are disposed in the first set of brackets for permitting lubricant to be transferred between the shafts of adjacent idler rolls and cover members are detachably mounted to these bracket members for urging the grommet assemblies into and retaining the grommets in their operable positions. These cover members as well as cover members for the second set of bracket members retain the end caps of the roll shafts within the openings or slots of the bracket members during operation.

BRIEF DESCRIPTION OF THE DRAWINGS

Reference is now made to the accompanying drawings for a better understanding of the nature and objects of the present invention. The drawings illustrate the best mode presently contemplated for carrying out the objects of the invention and are not to be construed as restrictions or limitations on its scope. In the drawings:

FIG. 1 is a front elevational view depicting the support assembly of the present invention with portions thereof being shown in cross section;

FIG. 2 is a partial side elevational view of the support assembly of FIG. 1;

DESCRIPTION OF THE PREFERRED EMBODIMENTS

Figure 3:
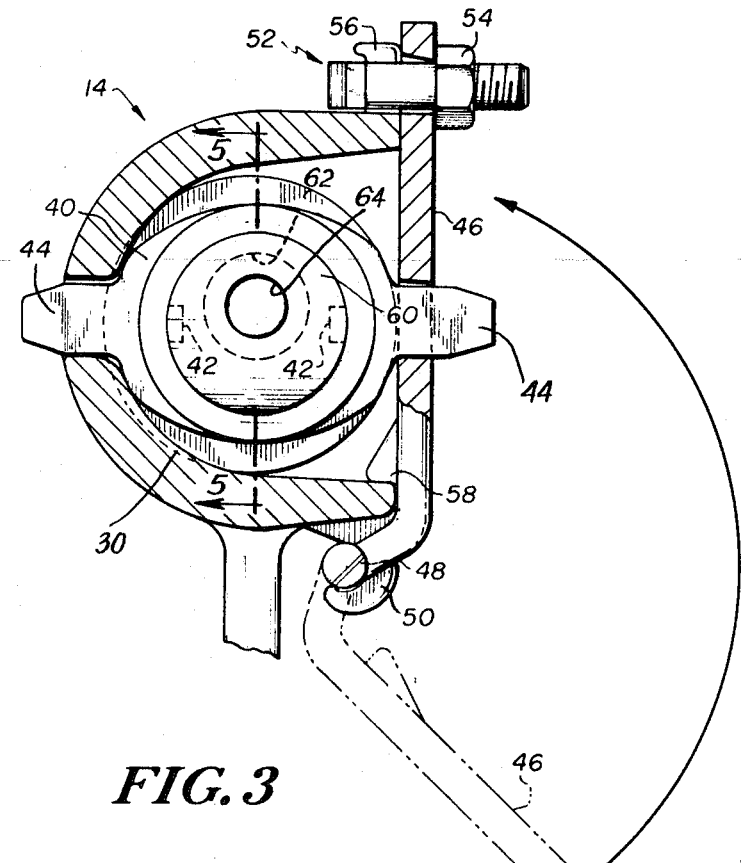
FIG. 3 is a transverse cross-sectional view taken substantially along the line 3—3 of FIG. 1.

Referring specifically to FIG. 1 of the drawings, the reference numeral 2 refers to an idler roll which is mounted between a pair of vertical support members 4 and 6, it being understood that this roll is one end roll of a series of three or more, and extends upwardly at an angle with respect to an adjacent horizontal roll 8. The rolls are arranged to support and trough a run of an endless belt conveyor 9 as it travels over the rolls.

The idler roll 2 is mounted for rotation through antifriction bearings (not shown) upon a dead tubular shaft 10 which extends axially through the roll 2 and protrudes at its ends beyond the end portions of the roll, in order that the opposite ends of the shaft 10 may be mounted in a pair of support brackets 12 and 14 which, in turn, are secured in any known manner to the vertical support members 4 and 6, respectively.

The support bracket 12 is inclined with respect to the support member 4 to accommodate the slanting roll 2 and has a generally U-shaped cross section defining a horizontally extending opening or slot for receiving end cap 16. The opening or slot is provided with a pair of flanges 18 formed in the bracket that extend into a pair of corresponding grooves formed in the end cap. The end cap 16, in turn, receives and is secured to the end portion of the shaft 10, with an adjusting collar 20 being positioned between the shaft and the end cap. A cover plate or holding bar 22, shown in FIG. 2, has one end mounted in a slot formed in the bracket 12 and is secured by a nut and bolt means 24 or other suitable means to the upper portion of the bracket. A grease fitting 26 is provided in the end portion of the end cap 16 so that grease may be forced through the interior of the shaft 10 to lubricate the antifriction bearings between the shaft and the roll through a plurality of radial passages 28 formed along the shaft 10, in a known manner.

The support bracket 14 also has a generally U-shaped cross section defining a horizontal opening which receives the end cap 30, attached to other end of the shaft 10 as well as an exposed end cap attached to the tubular shaft associated with the roll 8. Since the mounting of this end of the shaft 10 is identical to the mounting of the adjacent end of the shaft associated with the roll 8, only the former will be explained in detail. Specifically, the support bracket 14 receives end cap 30, that is the same as end cap 16, with a pair of flanges 32 formed on the support bracket extending into slots formed in the end cap. The end cap 30 receives and is secured to the end portion of the shaft 10 with an adjusting collar 34 being positioned between the shaft and the end cap.

Figure 5:
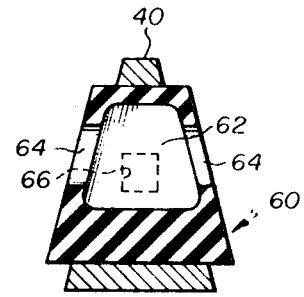
FIG. 5 is a transverse cross-sectional view taken along the line 5—5 of FIG. 3.
Figure 6:
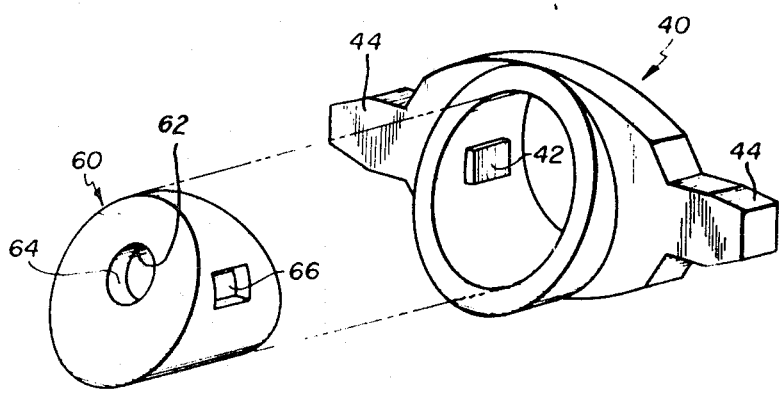
FIG. 6 is an exploded perspective view showing two components of the support assembly of the present invention.

A grommet retainer 40 is provided in the bracket 14 and is shown better with reference to FIGS. 3, 5 and 6. In particular, the retainer 40 has a central bore extending there through and a pair of diametrically opposed projections 42 formed on the wall of the bore, for receiving and securing a grommet, as will be explained in detail later. A pair of identical tapered tabs 44 are formed on the retainer 40 which are adapted to extend through openings formed in the rear portion of the bracket 14, and through openings formed in the rear portion of the bracket 14, and through a cover plate 46 for the bracket 14, respectively.

Figure 4:
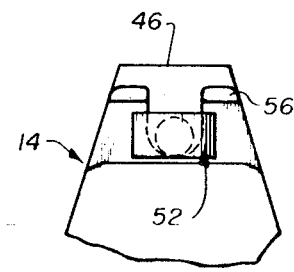
FIG. 4 is a fragmentary rear elevational view of the structure shown in FIG. 3.

The cover plate 46 pivots about a shaft 48, mounted on a clevis 50 formed on the bracket 14, between an open position shown by the dash lines wherein rolls 2 and 8 can be inserted or removed from the bracket, and a closed position shown by the solid lines in FIG. 3 wherein the cover plate engages the end caps of rolls 2 and 8 to maintain the rolls in place. The cover plate 46 is secured in its upper position by a suitable fastener means such as bolt 52 which extends through a hole formed near the free end of the cover plate, and which is adapted to be threadably engaged by a nut 54. The head of the bolt 52 is rectangular in shape so that it can be turned to a general vertical position in order to pass through a U-shaped member 56 secured the bracket 14. After it is inserted through this opening, the bolt is twisted until the head attains a horizontal position as shown in FIG. 4 to secure the coverplate 46 in its uppermost position. Of course, the nut 54 can then be further tightened to secure the cover plate 46, and therefore the retainer 40, with respect to the bracket 14. During the latter part of the upward pivotal movement of cover plate 46, one of the tapered tabs 44 extends through the opening in the cover plate and the lower surface of the tab engages and cooperates with the lower edge of the cover plate opening to urge the retainer 40 upward into operating position as the tapered tab 44 passes through the opening. This wedges the grommet carried by the retainer 40 between the end caps of rolls 2 and 8 and to relieve the loading which would otherwise be transferred to the loose fitting pivotal joint of the cover plate, tab 58 is provided on the cover plate which engages the lower inner wall of bracket 14. In addition to relieving the loading on the pivot joint once the cover plate is secured in its upper position, the lower surface of the tab engages and cooperates with the lower edge and the inner wall of bracket 14 during the upward pivotal movement of the cover plate 46 to urge the cover plate upward.

A grommet 60 of resilient material such as synthetic rubber, is provided in the bore of the retainer 40. As shown in FIG. 5, and enlarged cavity 62 is formed in the grommet which communicates with a pair of openings 64 formed through two walls of grommet, each of which is adapted to register with the end of the shaft 10 and the shaft associated with the roll 8. A pair of openings 66 having a square cross section are also provided in the other two walls of the grommet, which are complementary to and receive the projections 42 of the retainer 40 to secure the grommet within the retainer. As shown in FIG. 6, both the grommet and the grommet retainer have a tapered cross section to enable the end caps associated with the rolls 2 and 8 to engage a small flat surfaced portion of the grommet that extends outwardly from each side of the retainer 40, as shown in FIG. 1.

Roll 8 is mounted with respect to the support assembly by initially sliding the capped ends of its shaft in a generally horizontal direction into the slots of bracket 14 and a similar bracket (not shown) provided for supporting the other end of the roll. The roll 2 is mounted with respect to the support assembly by initially sliding the capped ends of shaft 10, in a general horizontal direction into the slots of brackets 12 and 14. The grommet retainer 40, carrying the grommet 60, is loosely mounted in the bracket 14 with one tab 44 of retainer 40 keyed into the opening in the rear portion of bracket 14. As cover plate 46 is rotated into its vertically closed position the remaining tab 44 of retainer 40 is engaged by the lower end of the opening in the cover plate and forced inward and upward into the position shown by the solid line of FIG. 3 which locks the grommet 60 into an operable position in engagement with the ends of the end cap 30 and the end cap associated with the roll 8. Of course, the holding bar 22 is fastened with respect to the bracket 10 to secure the other end of the shaft 10 to the support assembly.

Lubricant forced into the shaft 10 through the fitting 26 will pass into the hollow portion of the shaft 10, and through the radial passages 28 into the bearings. Excessive lubricant will pass through the smaller end cap opening and the larger grommet opening 64 into the enlarged cavity 62 formed in grommet 60 and from there through the other opening 64, and the smaller end cap opening, into the interior of the shaft associated with roll 8.

The larger openings 64 of the grommets 60 allow a greater tolerance for alignment of the grease flow passageway. When an idler is being greased, if the opening of the grommet is smaller than the end cap opening the grease comes into contact with the sealing face surrounding the grommet opening. As a result, the grease pressure would tend to force the sealing face of the grommet away from the sealing face of the end cap thereby creating the possibility of grease leakage. The larger openings 64 of grommets 60 prevents this and in the grommet of the present invention, the pressurized lubricant within inner enlarged cavity 62 of grommet 60 actually serves to increase the sealing pressure during initial lubrication or relubrication. That is, in grommet 60 the increase in pressure due to lubrication is acting on the interior of the enlarged cavity outwardly toward the outer sealing surfaces adjacent openings 64 thereby forcing the resilient sealing surfaces of grommet 60 against the sealing surfaces of the end caps to form a better seal.

The roll 2 is easily removed from its position shown in FIG. 1 by simply releasing the holding bar 22 and the cover plate 46 and moving the roll 2 and therefore the shaft 10 outwardly in a horizontal direction which permits the rolls to be easily interchanged and replaced.

It is understood that, in a typical installation, a second vertical support and bracket similar to support 6 and bracket 14 will be provided to accommodate the other end portion of the roll 8, as well as the end of a third roll mounted identically to the roll 2, while a third vertical support and bracket similar to vertical support 4 and bracket 12 will be provided to accommodate the other end of this third roll.

Of course, variations of the specific construction and arrangement of the support assembly disclosed above can be made by those skilled in the art without departing from the invention.

What is claimed is:

1. A support assembly for supporting adjacent ends of a pair of idler roll shafts, said assembly comprising: a bracket member having an opening therein for receiving adjacent ends of a pair of idler roll shafts, said opening being defined by horizontally extending spaced apart upper and lower surfaces and an end surface which interconnects said upper and lower surfaces; sealing means for preventing the loss of lubricant from the roll shafts, said sealing means being disposed in said opening, said sealing means adapted to engage only and faces of idler roll shafts to permit independent insertion or removal of idler roll shafts and said sealing means having a passage therein for permitting lubricant to be transferred between adjacent ends of idler roll shafts; and a cover member carried by said bracket member for closing said opening to retain adjacent ends of a pair of idler roll shafts within said opening and to retain said sealing means in an operable position in contact with adjacent ends of a pair of idler roll shafts.

2. The assembly of claim 1 wherein: said sealing means comprises a grommet member having a bore passing therethrough for registering with interiors of hollow idler roll shafts and a retainer means carrying said grommet member, said cover member engaging said retainer means to maintain said grommet member in an operable position when said opening is closed by said cover member.

3. The assembly of claim 2 wherein: said grommet member is resilient, said bore of said grommet member defines an enlarged cavity intermediate ends of said bore for permitting pressurized lubricant within said cavity to urge sealing surfaces adjacent the ends of said bore outward for engagement with ends of idler roll shafts.

4. The assembly of claim 1 wherein: said cover member is pivotally mounted with respect to said bracket member and is swingable from an open position where ends of idler roll shafts can be placed in said opening of said bracket member to a closed position where said sealing means is retained in said bracket member for engagement with ends of idler roll shafts.

5. A support bracket assembly for supporting adjacent ends of a pair of idler roll shafts, said assembly comprising: a bracket member having an opening therein for receiving adjacent ends of a pair of idler roll shafts, said opening being defined by horizontally extending spaced apart upper and lower surfaces and an end surface which interconnects said upper and lower surfaces, sealing means being disposed in said opening for preventing the loss of lubricant from idler roll shafts, said sealing means having a passage therein for permitting lubricant to be transferred between idler roll shafts, cover plate means carried by said bracket means for retaining adjacent ends of a pair of idler roll shafts and said sealing means within said opening, and wedging means for urging said sealing means into a sealing position against adjacent ends of idler roll shafts.

6. In the support bracket of claim 5 said sealing means comprising a sealing grommet means, a retainer means for retaining said sealing grommet means, said cover plate means having an aperture there through, and said wedging means comprising a tapered tab on said retainer means which cooperates with an edge of said aperture in said cover plate means to urge said sealing grommet means into said sealing position when said cover plate means is moved from an open position wherein adjacent ends of idler roll shafts can be inserted into or removed from said opening to a closed position wherein said cover plate means closes said open end of said opening to retain adjacent ends of idler roll shafts in place.

7. In the support bracket of claim 6: said cover plate means being pivotally mounted on said bracket means and being pivotal between said open position and said closed position, said aperture in said cover plate means being spaced a predetermined distance from the pivotal mounting of said cover plate means so that said edge of said aperture in cooperation with said tapered tab on said retainer means urges said sealing grommet means into said sealing position as said cover plate means is being closed.